US012585904B2

(12) United States Patent
Stefanini et al.

(10) Patent No.: US 12,585,904 B2
(45) Date of Patent: Mar. 24, 2026

(54) DYNAMIC DIFFUSIVE ILLUMINATION SYSTEMS AND METHODS

(71) Applicant: Datalogic IP Tech S.r.l., Calderara di Reno (IT)

(72) Inventors: Simone Stefanini, Bologna (IT); Davide Gavioli, San Vito di Spilamberto (IT); Michele Suman, Ponte San Nicolo (IT)

(73) Assignee: Datalogic IP Tech S.r.l., Calderara di Reno (IT)

( * ) Notice: Subject to any disclaimer, the term of this patent is extended or adjusted under 35 U.S.C. 154(b) by 88 days.

(21) Appl. No.: 17/839,198

(22) Filed: Jun. 13, 2022

(65) Prior Publication Data

US 2023/0401403 A1 Dec. 14, 2023

(51) Int. Cl.
G06K 7/14 (2006.01)

(52) U.S. Cl.
CPC .................................. G06K 7/1439 (2013.01)

(58) Field of Classification Search
CPC ...................................................... G06K 7/1439
See application file for complete search history.

(56) References Cited

U.S. PATENT DOCUMENTS

| | | | |
|---|---|---|---|
| 7,025,271 B2 | 4/2006 | Dvorkis et al. | |
| 9,754,144 B1 * | 9/2017 | Suman | G06K 7/10712 |
| 2007/0176003 A1 | 8/2007 | Brock | |

| | | | |
|---|---|---|---|
| 2010/0045847 A1 * | 2/2010 | Ryu | H04N 23/54 |
| | | | 348/E5.037 |
| 2010/0252633 A1 * | 10/2010 | Barkan | G06K 7/1096 |
| | | | 235/462.24 |
| 2011/0136492 A1 * | 6/2011 | Bailey | H04W 4/06 |
| | | | 455/445 |
| 2012/0118963 A1 * | 5/2012 | Drzymala | G06K 7/10722 |
| | | | 235/454 |
| 2017/0199357 A1 * | 7/2017 | Craen | G02B 3/14 |
| 2017/0364736 A1 * | 12/2017 | Ollila | H04N 25/531 |
| 2021/0088867 A1 * | 3/2021 | Nagel | G01N 21/8851 |
| 2021/0231903 A1 * | 7/2021 | Henriksen | G02B 26/08 |
| 2022/0244531 A1 * | 8/2022 | Lintz | H04N 13/211 |
| 2023/0063717 A1 * | 3/2023 | Barkan | H04N 23/55 |
| 2023/0375476 A1 * | 11/2023 | Vasefi | H04L 9/50 |
| 2024/0027850 A1 * | 1/2024 | Jamali | G02C 7/083 |

* cited by examiner

*Primary Examiner* — Thien M Le
*Assistant Examiner* — Asifa Habib
(74) *Attorney, Agent, or Firm* — Foley & Lardner LLP

(57) ABSTRACT

Systems and methods for reading machine-readable indicia (e.g., barcodes) can include emitting, by a code reading device, a light to illuminate a surface including a machine-readable indicia. The code reading device can capture an image of the machine-readable indicia, and determine whether an image quality parameter of the image of the machine-readable indicia captured by the image sensor satisfies a predefined condition (e.g., no reflections on the machine-readable indicia). Based on a determination that the image quality parameter of the image of the machine-readable indicia does not satisfy the predefined condition, the voltage being applied to the electrochromic component may be adjusted to cause an opacity level of the electrochromic component to be altered. Otherwise, the voltage being applied to the electrochromic component may remain unchanged.

18 Claims, 7 Drawing Sheets

302a

304

306a

306b

302b

300

308

Emit light to illuminate a surface depicting a pattern or object thereon   602

Capture an image of the surface   604

Determine whether an image quality parameter of the image of the surface satisfies a predefined condition   606

Adjust a translucency level of the electrochromic component based on the determination   608

600

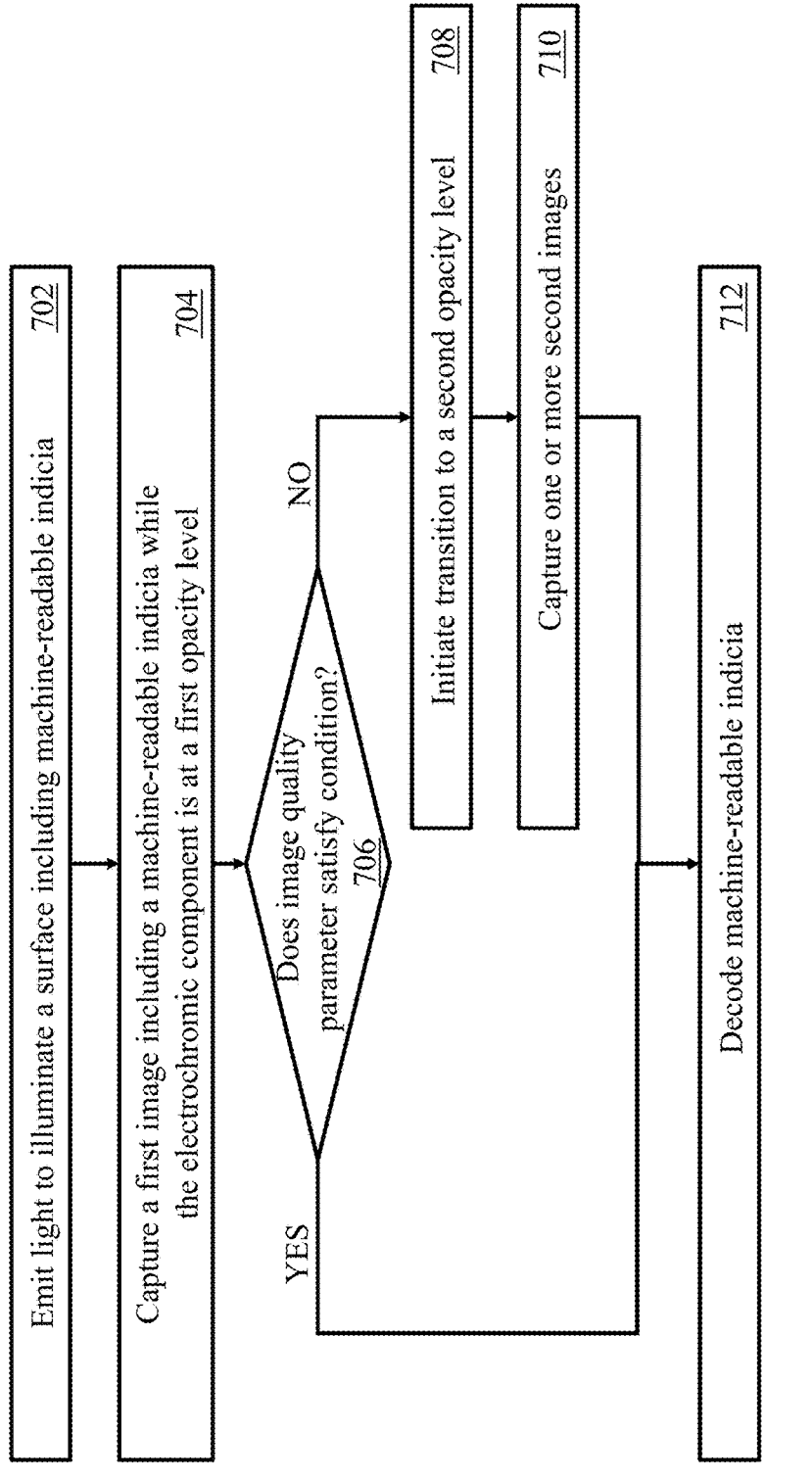

700

702 Emit light to illuminate a surface including machine-readable indicia

704 Capture a first image including a machine-readable indicia while the electrochromic component is at a first opacity level 706 Does image quality parameter satisfy condition?

NO

YES

708 Initiate transition to a second opacity level

710 Capture one or more second images

712 Decode machine-readable indicia

*FIG. 7*

DYNAMIC DIFFUSIVE ILLUMINATION SYSTEMS AND METHODS

BACKGROUND

A code scanner, also referred to herein as a code reader, is typically configured as an optical scanner or reader configured to read printed codes and to decode the data encoded in the codes. To scan or image a code, the code reader can illuminate a surface including a printed code or machine-readable indicia, such as a barcode, a quick response (QR) code, or other type of printed codes that may be read and decoded by a machine, and capture an image of the printed code. The code reader can then process the captured image to decode the code, and send the decoded data to a computer device for processing thereby.

Code readers are used in various applications, such as points-of-sale (POS) in retail stores, inventory tracking, ticket verification, biometrics or individual identification, gaming, manufacturing, logistics, among other applications. In general, code readers allow for faster and more accurate input and processing of information, such as identification of items, prices, identities of individuals, and so on.

Quality of an imaged machine-readable indicia may impact the ability of code readers to properly image and decode the machine-readable indicia. A number of factors affect the quality of the imaged machine-readable indicia, including blur, distance, lighting, reflection from a surface on which the machine-readable indicia is positioned, and so on. A number of techniques have been used to reduce the impact of these factors so as to improve imaging of the machine-readable indicia, and the techniques generally result in use-specific code readers. For example, code readers for manufacturing, retail, inventory, logistics, etc., tend to be different as a result of the code readers being designed for specific applications, which include different uses, environments, and/or surfaces on which the codes are positioned.

SUMMARY

Implementations described herein relate to improvements in the field of code scanning. In particular, implementations described herein relate to systems, devices, and processes including dynamic diffusive illumination by code readers. The use of dynamic diffusive illumination allows the code reader to accommodate or support multiple types of applications, such as logistics, manufacturing, inventory, retail, points-of-sale, and so on.

One embodiment of a code reading device can include an image sensor configured to capture images including a machine-readable indicia and an illumination system configured with a light source to illuminate a surface on which the machine-readable indicia is positioned when imaging the machine-readable indicia. An electrochromic component may be arranged in front of the light source, such that light generated by the light source passes through the electrochromic component. Driver circuitry may be configured to control opacity of the electrochromic component by controlling voltage applied to the electrochromic component. The code reading device can include a processor in electrical communication with the image sensor and the electrochromic component driver circuitry. The processor can be configured to determine whether an image quality parameter of an image of the machine-readable indicia captured by the image sensor satisfies a predefined condition, and cause, based on a determination that the image quality parameter of the image of the machine-readable indicia does not satisfy the predefined condition, the driver circuitry to adjust the voltage being applied to the electrochromic component to cause an opacity level of the electrochromic component to be altered. Otherwise, the driver circuitry may maintain the voltage being applied.

The electrochromic component can include an electrochromic film or an electrochromic glass. In determining the image quality parameter of the image of the machine-readable indicia, the processor can be configured to determine whether the image includes one or more regions indicative that corresponding one or more pixel regions of the image sensor were saturated when the image was captured, or to determine whether the machine-readable indicia is decodable based on the image of the machine-readable indicia captured by the image sensor.

The processor can be configured to cause the circuitry to decrease or switch OFF the voltage being applied to the electrochromic component to diffuse or block the light in response to determining that the image of the machine-readable indicia is indicative of one or more pixel regions of the image sensor being saturated. The processor can be configured to cause the driver circuitry to adjust the voltage applied to the electrochromic component in response to determining that the machine-readable indicia is not decodable from the image captured by the image sensor.

The processor, in causing the driver circuitry to adjust the opacity level of the electrochromic component, can be configured to cause the electrochromic component to transition from a first opacity level to a second opacity level. The processor can be configured to cause the image sensor to capture one or more second images of the machine-readable indicia while the electrochromic component is transitioning from the first opacity level to the second opacity level. The processor can be configured to attempt to decode the machine-readable indicia captured in each second image. The processor can be configured to cause the driver circuitry to halt the transition from the first opacity level to the second opacity level in response to decoding the machine-readable indicia captured in a second image captured while the electrochromic component is transitioning from the first opacity level to the second opacity level. The processor can further be configured to decode the machine-readable indicia using a second image captured after transitioning from the first opacity level to the second opacity level.

One embodiment of a process for operating a code reading device can include emitting a light to illuminate a surface including a machine-readable indicia. An image of the machine-readable indicia may be captured, and a determination as to whether an image quality parameter of the image of the machine-readable indicia captured by the image sensor satisfies a predefined condition. Based on a determination that the image quality parameter of the image of the machine-readable indicia does not satisfy the predefined condition, the voltage being applied to the electrochromic component may be adjusted to cause an opacity level of the electrochromic component to be altered. Otherwise, the voltage being applied to the electrochromic component may be maintained.

The electrochromic component can include an electrochromic film or an electrochromic glass. Determining the image quality parameter of the image of the machine-readable indicia can include determining whether the image includes one or more regions indicative that corresponding one or more pixel regions of the image sensor were saturated, or determining whether the machine-readable indicia is decodable based on the image of the machine-readable indicia captured by the image sensor.

The process can further include decreasing or switching OFF the voltage being applied to the electrochromic component in response to determining that the image of the machine-readable indicia is indicative of one or more pixel regions of the image sensor being saturated. The voltage applied to the electrochromic component may be adjusted in response to determining that the machine-readable indicia is not decodable from the image captured by the image sensor.

Adjusting the opacity level of the electrochromic component can include causing the electrochromic component to transition from a first opacity level to a second opacity level. One or more second images of the machine-readable indicia may be captured while the electrochromic component is transitioning from the first opacity level to the second opacity level. The method can include attempting to decode the machine-readable indicia captured in each second image. The transition from the first opacity level to the second opacity level may be halted in response to decoding the machine-readable indicia captured in a second image captured while the electrochromic component is transitioning from the first opacity level to the second opacity level. The machine-readable indicia may be decoded using a second image captured after transitioning from the first opacity level to the second opacity level.

BRIEF DESCRIPTION OF THE DRAWINGS

Illustrative embodiments of the present invention are described in detail below with reference to the attached drawing figures, which are incorporated by reference herein and wherein:

FIG. 7 is a flowchart of another illustrative method of imaging machine-readable indicia by dynamically controlling an electrochromic component to dynamically alter illumination.

Some or all of the figures are schematic representations for purposes of illustration. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

DETAILED DESCRIPTION

Machine-readable indicia can be printed on or applied to cards, items, or packages to carry encoded data. As used herein, machine-readable indicia can include letters, numbers, symbols, shapes, graphics or a combination thereof forming barcodes, direct part marking (DPM) codes, QR codes, hidden codes (e.g., codes readable using certain illumination outside the visible spectrum), among other codes. To read or scan the machine-readable indicia, a code reader usually illuminates the surface including the machine-readable indicia, captures an image of the illuminated surface, and decodes the data encoded in the machine-readable indicia. Code readers usually include an illumination system for illuminating machine-readable indicia or codes to be read or scanned.

Illumination systems of code readers are generally designed to perform specific applications. For example, general purpose scanners are usually equipped with powerful illumination systems (i) to illuminate barcodes that are relatively far away, and (ii) to ensure good motion tolerance. DPM code readers usually employ diffusive light illumination to avoid saturated image regions due to reflections from metal surfaces including the DPM codes. Also, for several applications for both industrial and retail scanners, codes may be located below a transparent film (e.g., cigarette packages) or behind a Plexiglas® barrier (e.g., the Plexiglas® barrier used to secure goods from theft in a retail environment). The illumination of these codes often leads to reflections that can prevent the code reader from accurately scanning and decoding the code. To overcome the undesired effect of the light reflections, the code scanner may alter the illumination system, such as by turning OFF the illumination system. However, turning OFF the illumination results in diminished contrast and reduces motion tolerance. As such, a code reader with a dynamic diffusive illumination capability may be utilized to support use for different applications.

Figures 1A, 1B:
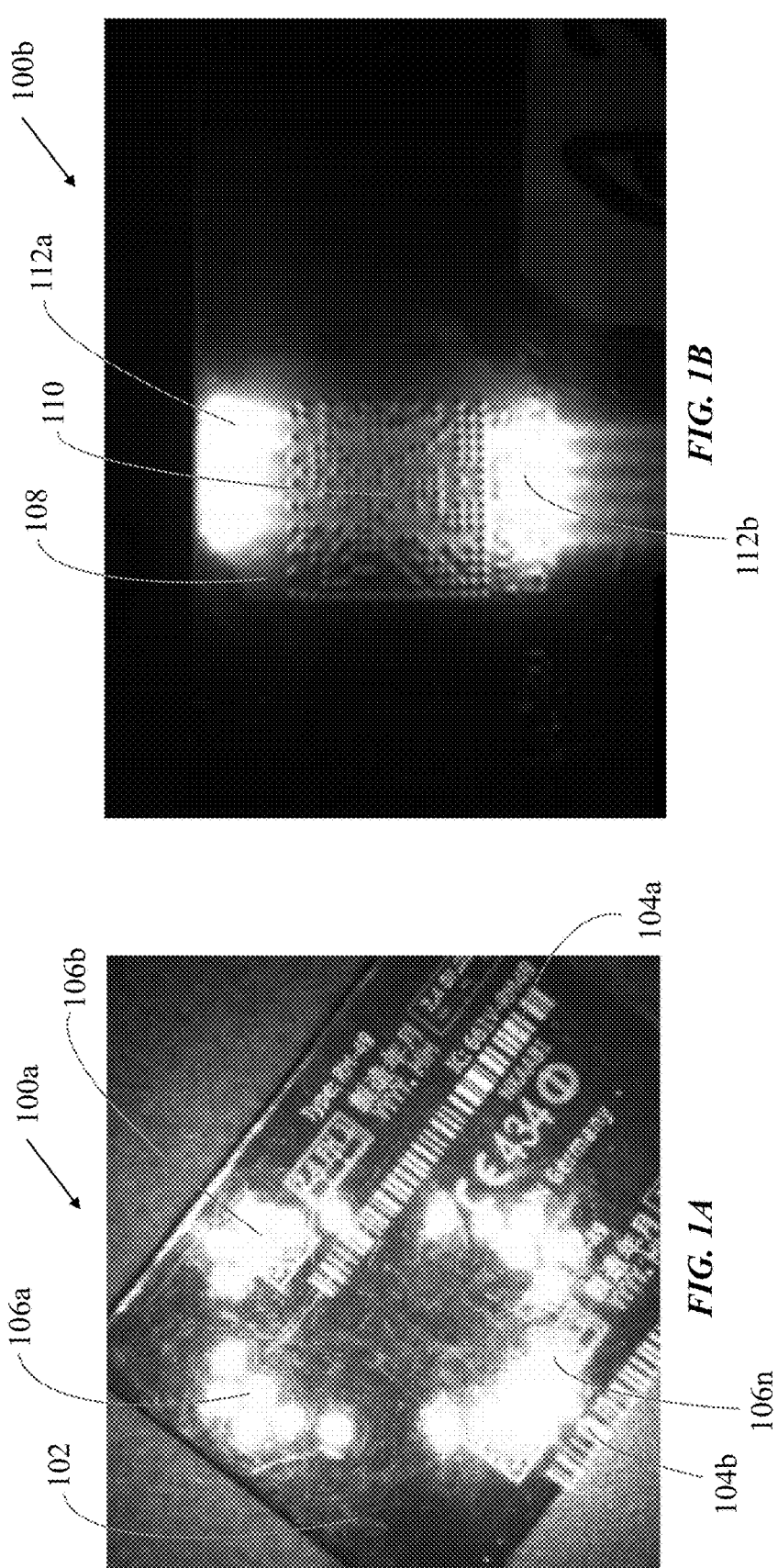
FIGS. 1A and 1B are images of illustrative surfaces including machine-readable indicia or codes illuminated by light sources without a light diffuser.

Referring to FIGS. 1A and 1B, two example images 100a and 100b of surfaces including codes illuminated by light sources without a light diffuser are shown. In image 100a, the surface 102 includes multiple barcodes 104a and 104b (one type of machine-readable indicia) that are covered with a plastic transparent film (e.g. lamination). When the surface 102 is illuminated without using a light diffuser, light reflections from the surface 102 leads to multiple saturated image regions 106a, 106b, . . . , 106n, in the image 100a as a result of the reflections causing regions of an image sensor to saturate. Some of these saturated (e.g., very bright) image regions can obfuscate one or more portions of the barcodes 104a and 104b, therefore, preventing the code reader from decoding the barcode 104a and/or the barcode 104b. In image 100b, a metal surface 108 includes a DPM code 110 marked thereon. When applying non-diffusive light illumination, light reflections from the metal surface 108 lead to the image 100b captured by the code reader having saturated image regions 112a and 112b. The saturated image regions 112a and 112b can obfuscate parts of the DPM code 110. As a result, the code reader may not be able to decode the DPM code based on the image 100b.

Code readers, illumination systems, and code scanning methods that support several different applications and address the technical problem described above. The devices, systems, and methods described herein may be combined in a single code reader, thereby being capable of performing several different applications, such as (i) general purpose code scanning, (ii) far-field scanning/decoding, (iii) scanning codes arranged beneath transparent films, (iv) scanning codes behind Plexiglas® or other transparent materials, and/or (v) scanning DPM codes marked on reflective surfaces. Specifically, a dynamic diffusive illumination system can be employed in a code reader to dynamically change illumination onto a code positioned on different surfaces or different locations (e.g., far away, behind Plexiglas®, etc.) and therefore accommodate various applications. The dynamic diffusive illumination system can include an "active" coated material arranged on the illumination source (e.g., LEDs), which can dynamically change optical properties thereof to provide different illumination types on and/or levels the target surface.

Existing code scanners are generally designed to support or accommodate one or part of the applications described above. For example, DPM code readers usually have very limited depth of field (DOF) decoding capabilities. Also, code scanners with high motion tolerance usually perform poorly with reflective surfaces. The devices, systems and methods described herein allow for a good performance in all the various applications described above with the same illumination system design.

Figure 2:
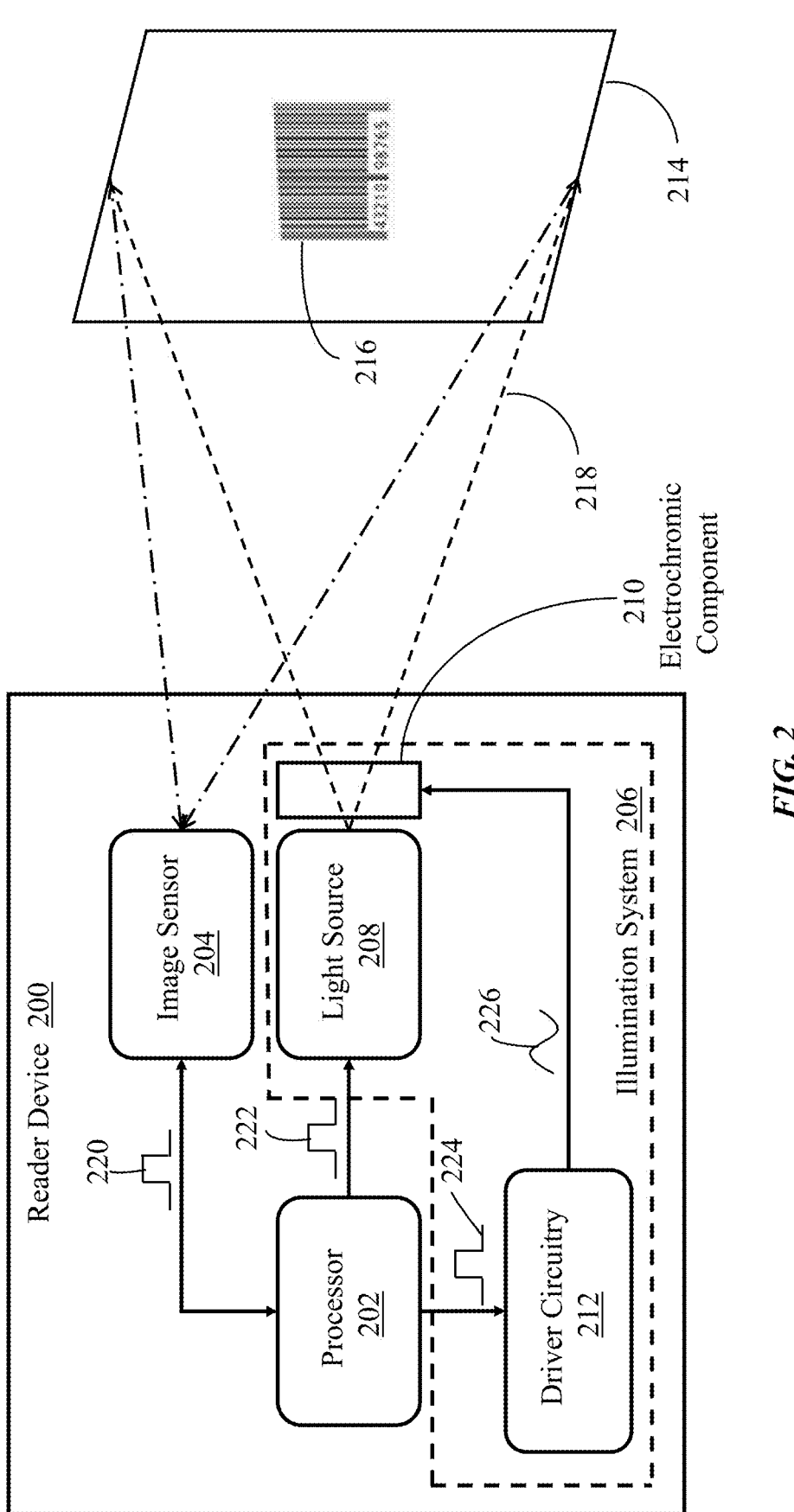
FIG. 2 is a block diagram of an illustrative code reader employing dynamic illumination.

Referring now to FIG. 2, a block diagram of an illustrative code reader (or code scanning device) 200 employing dynamic illumination is shown. The code reader 200 can include a processor 202, in communication with an image sensor (e.g., photodetector) 204 and an illumination system 206. The illumination system 206 can include a light source 208, an electrochromic component 210, and a driver circuitry 212, and can be configured to illuminate a surface 214 on which the machine-readable indicia (or code) 216 resides. The light source 208 can generate or emit light 218 to illuminate the surface 214 when imaging the machine-readable indicia 216. The electrochromic component 210 can be arranged in front of the light source 208, such that light 218 generated by the light source 208 passes through the electrochromic component 210. The driver circuitry 212 can be configured to control opacity of the electrochromic component 210 by controlling voltage applied to the electrochromic component 210, thereby enabling the light from the code reader 200 to be dynamically controlled or altered by dynamically controlling opacity of the electrochromic component 210. The processor 202 can be configured to communicate control signals and/or communicate data with the image sensor 204, the light source 208, and/or the driver circuitry 212, as further described hereinbelow.

The processor 202 can communicate with the image sensor 204 by sending and/or receiving signals 220. The signals 220 can be digital signals or analog signals. The signals 220 can include control signals sent by the processor 202 to trigger the image sensor 204 to capture images of the surface 214 including the machine-readable indicia 216. The signals 220 can also include data signals sent by the image sensor 204 to the processor 202. The data signals 220 may represent images captured by the image sensor 204. The image sensor 204 can include a camera and/or a photodetector with a matrix of pixels. As described in further detail below, the image sensor 204 can capture a single image or a sequence of images when triggered by the processor 202. In some implementations, the processor 202 can trigger the image sensor 204 to capture images of the surface 214 responsive to the code reader 200 being activated manually or automatically to scan or image the machine-readable indicia 216.

In some implementations, when the code reader 200 is activated to scan the machine-readable indicia 216, the processor 202 can send a signal 222 to activate the light source 208. When activated, the light source 208 can generate and/or emit light 218 that passes through the electrochromic component 210 to illuminate the surface 214. Once activated by the processor 202, the light source 208 may emit light 218 continuously or otherwise (e.g., for certain duration(s)). The processor 202 can deactivate the light source 208 once the machine-readable indicia 216 is imaged by the image sensor 204 and/or decoded by the processor 202. The light source 208 can include one or more light-emitting diodes (LEDs), one or more infrared light sources, other type(s) of light source(s), or a combination thereof.

The electrochromic component 210 can include an "active" coated material arranged on the light source 208 such that the light 218 emitted by the light source 208 passes through the electrochromic component 210. The term "active" implies that the optical property of the electrochromic component 210 can be actively changed (e.g., transition from opaque to transparent or be set at any level of translucence). By changing the optical properties of the electrochromic component 210, the code reader 200 or the processor 202 can dynamically change the type of the light 218 (e.g., diffusive or non-diffusive), and therefore dynamically change the type of illumination applied to the surface 214. In some implementations, the electrochromic component 210 can include an electrochromic film or an electrochromic glass that is controlled by a voltage applied thereto.

Figure 3:
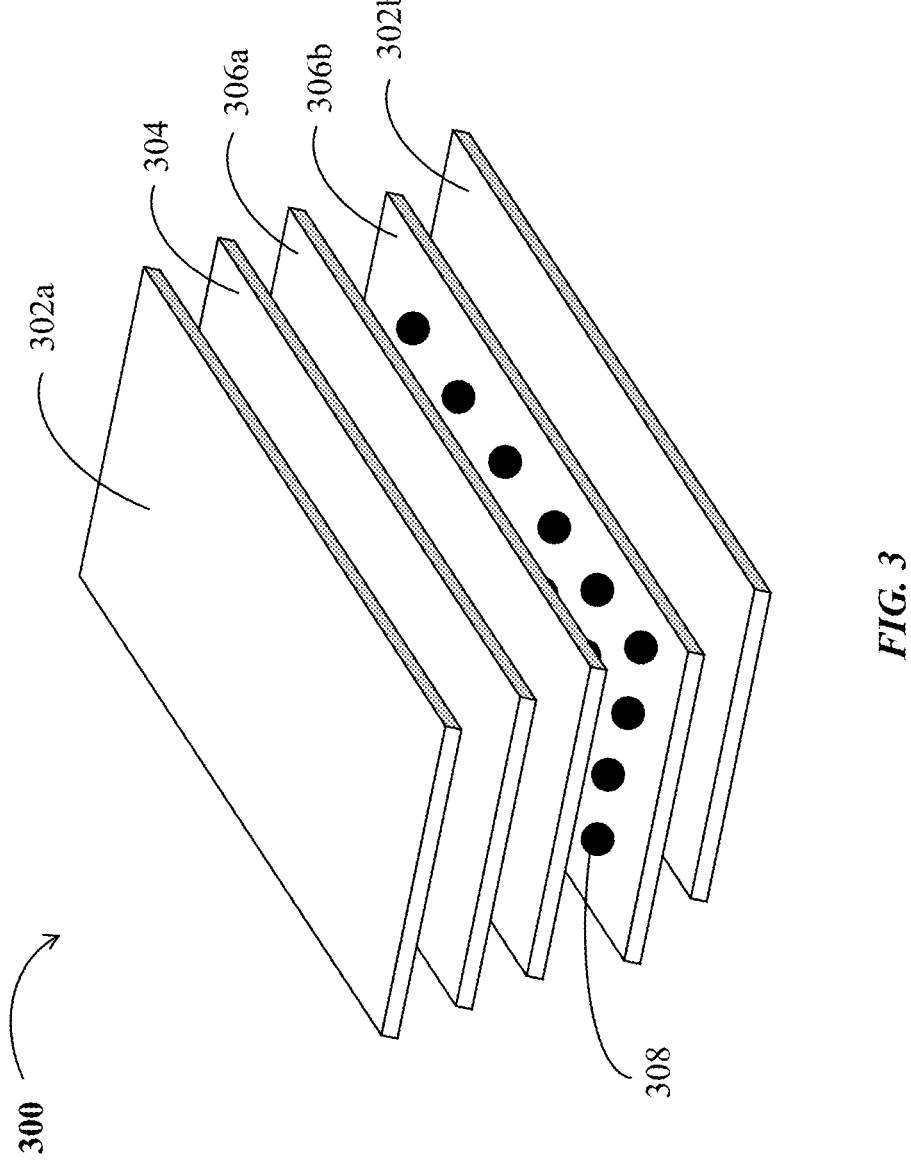
FIG. 3 is an illustration of an illustrative layered structure of an electrochromic configuration.

Referring now to FIG. 3, an illustration of a layered structure of an electrochromic component 300 is shown. The electrochromic component 300 illustrates an example of the electrochromic component 210 that may be used in the code reader 200 to support a dynamic diffusive illumination system. The electrochromic component 300 can include two protective layers 302a and 302b, an adhesive layer 304, two indium tin oxide (ITO) layers 306a and 306b, and polymer dispersed liquid crystal (PDLC) 308 arranged between the ITO layers 306a and 306b. The protective layers 302a and 302b can be made of glass or plastic films. The adhesive layer 304 mechanically couples the protective layers 302a and 302b to the ITO layers 306a and 306b. The combination of the ITO layers 306a and 306b and the PDLC can be viewed as forming a PDLC film whose opacity can be actively changed by applying a voltage (the same or different) to both sides of the PDLC film. The protective layers 302a and 302b can provide mechanical protection to PDLC film.

Figures 4A, 4B:
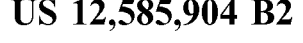
FIGS. 4A and 4B are diagrams illustrating an electrochromic component respectively in an opaque state and a transparent state.

Referring to FIGS. 4A and 4B, diagrams illustrating an electrochromic component 400 respectively in an opaque state and a transparent state are shown. The electrochromic component 400 illustrates another example of the electrochromic component 210 used in the code reader 200 to support the dynamic diffusive illumination system. The electrochromic component 400 can include two protective layers 402a and 402b, two adhesive layers 404a and 404b, two ITO films 406a and 406b, conductive coatings 408a and 408b, and a PDLC 410. The PDLC 410 can include a plurality of liquid crystals 412a-412n. The conductive coatings 408a and 408b can be electrically connected to voltage source 414 and a switch 416.

Similar to the protective layers 302a and 302b of FIG. 3, the protective layers 402a and 402b can be made of glass or plastic, and can provide mechanical protection to layers and/or material therebetween. The adhesive layers 404a and 404b mechanically connect the protective layers 402a and 402b to the ITO films 406a and 406b, respectively. The conductive coatings 408a and 408b can be applied to the surfaces of the ITO films facing the PDLC 410. The conductive coatings 408a and 408b may be formed as electrically conductive metallic coatings.

In operation, as shown in FIG. 4A, when the switch 416 is in an open state 418a, no voltage is applied to the conductive coatings 408a and 408b, and the liquid crystals (or molecules) 412a-412n are randomly oriented within the PDLC 410. As such, the liquid crystals (or molecules) 412a-412n block most of the light rays 420 entering the electrochromic component 400. This state of the electrochromic component 400, when the switch 416 is open, is referred to as the opaque state since most of the light entering the PDLC 410 is blocked by the liquid crystals (or molecules) 412a-412n.

When the switch 416 is in a closed state 418b, as shown in FIG. 4B, the voltage source 414 can apply a voltage or potential difference between the conductive coatings 408a and 408b. The applied voltage causes the liquid crystals (or molecules) 412a-412n in the PDLC 410 to be oriented or aligned in a parallel manner along the direction of the light rays 420, thereby allowing light rays 420 to pass through the PDLC 410 and through the electrochromic component 400. This state of the electrochromic component 400, when the switch 416 is in the closed state 418b and the liquid crystals are in parallel with one another, is referred to as the transparent state. Referring back to FIG. 2, the code reader 200 or the processor 202 can cause the electrochromic component 400 to switch between the opaque and transparent states by actively switching ON or OFF the switch 416, and therefore, dynamically change the type of illumination applied to the surface 214.

The driver circuitry 212 can be configured to control opacity of the electrochromic component by controlling a voltage level applied to the electrochromic component 210. In other words, different voltage levels may be used to cause different opacity levels, thereby supporting dynamic diffusive lighting. The driver circuitry 212 can act as, or can include, the switch 416 shown in FIG. 4. It should be understood that the driver circuitry 212 is illustrative and that alternative configurations are possible.

Figure 5:
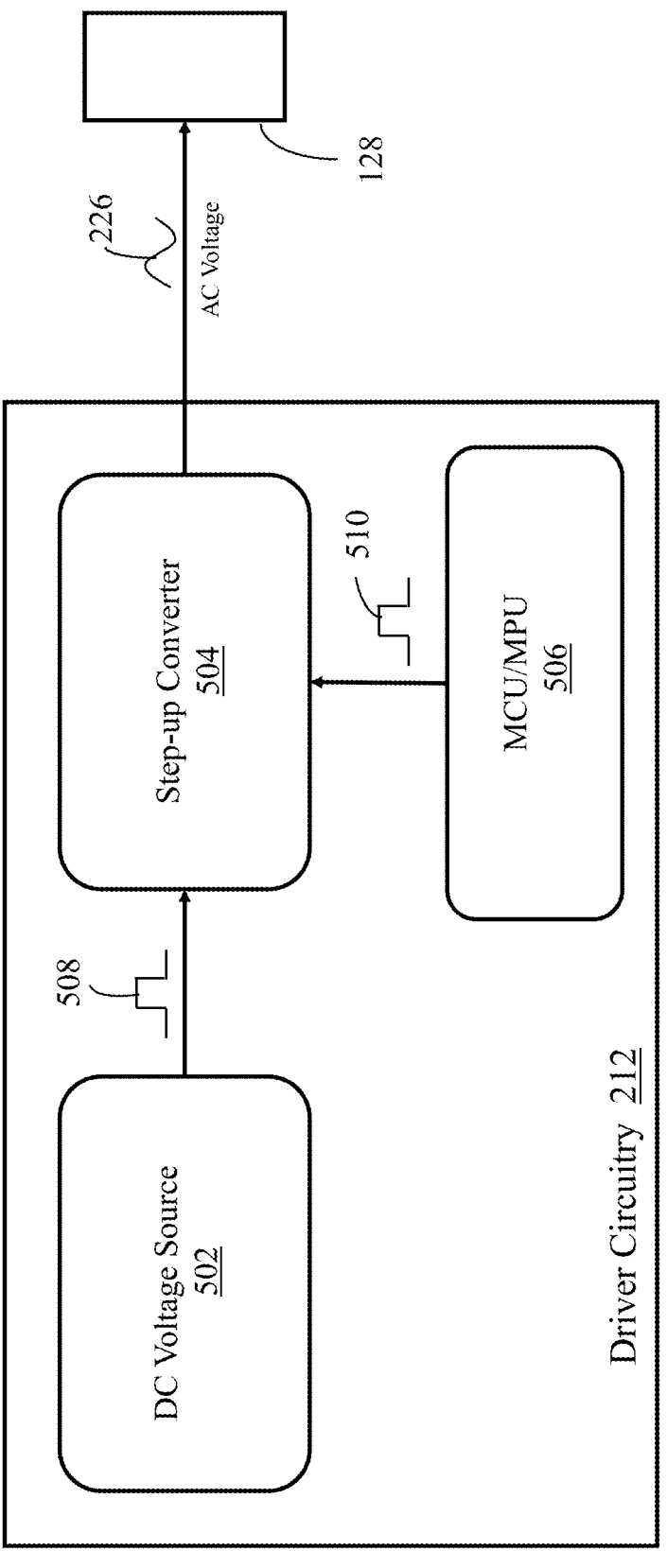
FIG. 5 is a block diagram of an illustrative driver circuitry for driving the electrochromic component between different components.

Referring to FIG. 5, a block diagram of the driver circuitry 212 is shown. In brief overview, the driver circuitry 212 can include a DC voltage source 502, a step-up converter 504 and a microcontroller unit or microprocessor unit (MCU/MPU) 506.

In particular, the DC voltage source 502 can include one or more batteries to provide a DC voltage or a DC signal 508. The step-up converter 504 can transform the DC signal 508 into the AC voltage or AC signal 226 that is applied to the electrochromic component 210 of FIG. 2. The MCU/MPU 506 can be communicatively coupled to the processor 202 in FIG. 2. The MCU/MPU 506 can receive the instruction signal 224 from the processor 202. An instruction signal 224 can include an instruction for the MCU/MPU 506 to activate or deactivate the step-up converter 504. When activated, the step-up converter 504 transforms the DC signal 508 into the AC voltage or AC signal 226, and outputs the AC voltage or AC signal 226 to be applied to the conductive coatings 408a and 408b shown in FIG. 4, thereby causing the electrochromic component 210 to switch from the opaque state to the transparent state (or another translucent or diffusive state therebetween). When deactivated, the step-up converter 504 can act as an open circuit (similar to the open state 418a of the switch 416 in diagram (a) of FIG. 4), thereby causing the electrochromic component 210 to switch to (or to be in) the opaque state.

The processor 202 can control the image sensor 204 and the illumination system 206. Specifically, the processor 202 can trigger the light source 208 to generate or emit light, and control the state of the electrochromic component 210 via the driver circuitry 212. The processor 202 can trigger the image sensor 204 to capture one or more images of the machine-readable indicia 216, and receive the one or more captured images from the image sensor 204. The processor

202 can process the captured image(s), and determine based on one or more image parameters of the image(s) whether to change the state of the electrochromic component 210 or not. The functions or processes performed by the processor 202 are discussed in further detail below in relation with FIGS. 6 and 7.

Figure 6:
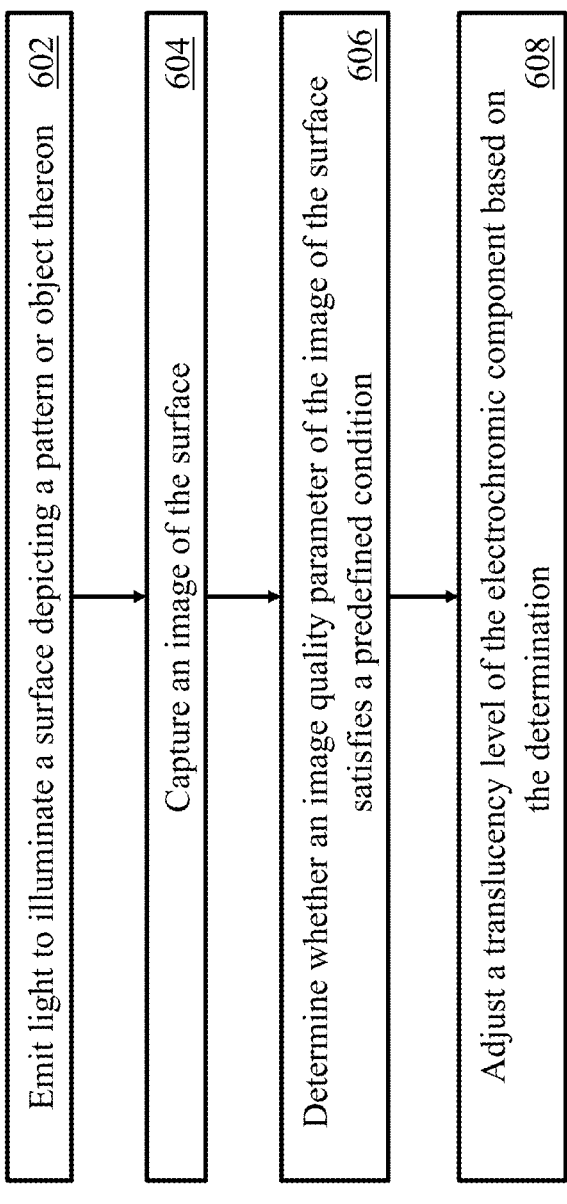
FIG. 6 is a flowchart of an illustrative method of scanning machine-readable indicia by dynamically controlling illumination by dynamically controlling an electrochromic component.

Referring now to FIG. 6, a flowchart of an illustrative method 600 of scanning machine-readable indicia by dynamically controlling illumination is shown. In brief overview, the method 600 can include emitting or generating light to illuminate a surface including machine-readable indicia (STEP 602), and capturing an image of the machine-readable indicia (STEP 604). The method 600 can include determining whether an image parameter (or image quality parameter) of the image of the machine-readable indicia satisfies a predefined condition (STEP 606), and adjusting an opacity level (or opacity state) of the electrochromic component based on a determination that the image parameter does not satisfy the predefined condition (STEP 608).

Referring now to FIGS. 2-6 to illustrate the illustrative process 600 of FIG. 6, the image sensor 208 can emit or generate light 218 to illuminate the surface 214 including machine-readable indicia 216 (STEP 602). The processor 202 can send the signal 222 to instruct the light source 208 to be actuated, and to generate or emit the light 218 to illuminate the surface 214. For example, the processor 202 can activate the light source responsive to the code reader 200 being activated to scan machine readable indicia. In some implementations, the light source 208 can emit the light 218 continuously until deactivated by the processor 202, which may occur in response to (i) the image sensor 204 capturing an image and communicating a modification or image data via signals 220 to the processor 202 or (ii) the processor 202 decoding the machine-readable indicia 216.

The method 600 can include the image sensor 204 capturing an image of the machine-readable indicia 216 (STEP 604). The processor 202 can instruct the image sensor 204 to capture an image of the machine-readable indicia 216. The processor 202 may instruct the image sensor 204 simultaneously with or immediately after activating the light source 208. When instructed, the image sensor 204 can capture one image or a sequence of images of the machine-readable indicia 216. For instance, the image sensor 204, when triggered by the processor 202, can start capturing images of the machine-readable indicia 216 periodically and/or during a set time period or window after the trigger is received by image sensor 204. In some implementations, the processor 202 can send a separate instruction to the image sensor 204 for each new image of the machine-readable indicia 206 to be captured. The image sensor 204 can transmit each captured image to the processor 202.

The method 600 can include the processor 202 determining whether an image parameter (or image quality parameter) of the image received from the image sensor 204 satisfies a predefined condition (STEP 606). In determining whether the captured image satisfies the predefined condition, the processor 202 can analyze or process each image received from the image sensor 204 (e.g., sequentially) to determine one or more corresponding image parameters. For example, the processor 202 can process each image to determine whether the image includes one or more regions indicative that corresponding one or more pixel regions of the image sensor 204 are saturated (e.g., pixel data in pixel region(s) above or below threshold value(s)). As depicted in and described in relation with FIG. 1, light reflections from the surface 214 can result in bright or white spots (e.g., regions 106a-106n, 112a and 112b in FIG. 1) in the captured image. The bright or white spots indicate that the corresponding pixel regions of the image sensor 204 are saturated by reflected light from a surface. This scenario usually occurs when the image surface includes a reflective surface, such as a metal surface, glass surface, or a transparent film in front of the machine-readable indicia, and the light emitted by the light source 204 is non-diffusive. The bright or white spots can obscure a portion of the machine-readable indicia 216 and therefore prevent accurate decoding of the machine-readable indicia 216. The determined image parameter(s) can include a binary parameter indicative of whether or not the image includes bright or white spots, a binary parameter indicative of whether or not a bright or white spot obfuscates a portion of the machine-readable indicia 216, a number of bright or white spots in the image, a size of a bright or white spot in the image, or a combination thereof amongst other parameters related to bright or white spots in the image.

In some implementations, the processor 202 can attempt to identify and decode the machine-readable indicia 216 in each image received from the image sensor 204. The image quality can influence or affect the ability for the processor 202 to identify and/or decode the machine-readable indicia 216. For example, if the image received from the image sensor 204 does not have enough contrast, is relatively dark or includes bright or white spots due to reflected light from the surface 214, the processor 202 may not be able to identify and/or decode the machine-readable indicia 216 in the captured image (or a frame of a video). Even if the processor 202 is able to decode the machine-readable indicia 216, such decoding may not be reliable in terms of accuracy due to relatively bad image quality (e.g., contrast level that makes reading a machine-readable indicia difficult). The processor 202 can generate a binary parameter indicative of whether the identification and/or decoding of the machine-readable indicia 216 was successful, the parameter may be indicative of a measure of reliability of an imaged and/or decoded machine-readable indicia 216 being properly image captured and/or decodable.

In some implementations, the processor 202 can analyze or process the image received from the image sensor 204 to assess contrast and/or brightness of the image. For example, the processor 202 can compute the minimum, average, and/or maximum brightness of the image. Accordingly, the processor 202 can generate one or more parameters indicative of levels of brightness and/or contrast of the image. Still yet, the processor 202 can generate one or more parameters indicative of number and/or sizes of bright spots, optionally in proximity to machine-readable indicia. For example, if one or more bright spots are positioned on a machine-readable indicia or within a certain number of pixels from a region in which a QR code or other code is located in an image, then a parameter may be set to indicate that the lighting is to be dynamically changed and optionally which direction (e.g., make brighter, make darker, increase or decrease a diffusive lighting).

The processor 202 can determine or generate any combination of the image parameters (or image quality parameters) discussed above and/or other parameters indicative of the quality of the image received from the image sensor 204. In general, the processor 202 can check whether or not the one or more image parameters are indicative of good image quality and/or successful decoding of the machine-readable indicia 216 in the first image. In some implementations, the processor 202 can use a combination of the above described image parameters in determining whether or not to trigger the electrochromic component 210 to transition from one opacity level or state to another opacity level or state.

The method 600 can include the processor 202 adjusting an opacity level of the electrochromic component 210 based on a determination that the image parameter does not satisfy the predefined condition (STEP 608). The processor 202 can adjust the opacity level of the electrochromic component 210 (e.g., switching or transitioning to a different opacity level or state) if the image parameter is determined to satisfy one or more predefined conditions. For example, if the image parameter is indicative of the existence of at least one bright or white spot in the image and/or the at least one bright or white spot obfuscates at least part of the machine-readable indicia 216, the processor 202 can cause the electrochromic component 210 to switch from the opaque state to the transparent state, e.g., by causing the driver circuitry 212 to apply a voltage to the electrochromic component 210 or the conductive coatings 408 and 408b as described above in relation with FIGS. 3 and 4.

In some implementations, the processor 202 can compare one or more image quality parameters indicative of a brightness level and/or a contrast level of the image to one or more respective thresholds. The processor 202 can decide whether or not to change an opacity level of the electrochromic component 210 based on the comparison. For example, if the comparison result indicates that the brightness level and/or a contrast level of the image is below a respective threshold, the processor 202 can cause the electrochromic component 210 to switch from the opaque state to the transparent state. In some implementations, the processor 202 can cause the electrochromic component 210 to switch from the transparent state to the opaque state. In an embodiment, the transition may occur in a sequence of steps (e.g., 10% steps) for example, until the processor 202 determines that an image quality parameter satisfies a predefined condition (e.g., no or minimal number of bright spots, brightness level below a threshold contrast level within a range, etc.).

In some implementations, the processor 202 can cause the electrochromic component 210 to switch from the opaque state to the transparent state, responsive to failing to decode the machine-readable indicia 216 or determining that the decoding is not reliable (e.g., a decoding reliability parameter is below a respective threshold). The processor 202 may cause the electrochromic component 210 to switch from a current opacity state or level (e.g., regardless of what the current state is) to a different to opacity state or level, responsive to failing to decode the machine-readable indicia 216 or determining that the decoding is not reliable (e.g., a decoding reliability parameter is below a respective threshold).

In some implementations, the transition of the electrochromic component 210 from one opacity level or state to another can take longer than the time taken by the image sensor to capture a single image. For example, the duration of the transition of the electrochromic component 210 can be greater than or equal to multiple times the time period of the image sensor 204 to capture a single image based on a manufacturer's specification. The processor 202 can cause the image sensor 204 to capture one or more additional images of the machine-readable indicia 216 while the electrochromic component 210 is transitioning from a first opacity level to a second opacity level. The processor 202 can receive the additional images captured during the transition of the electrochromic component 210, and attempt to decode the machine-readable indicia captured in each additional image. In some implementations, the processor 202 can cause the driver circuitry 212 to halt the transition from the first opacity level to the second opacity level in response to successfully decoding the machine-readable indicia in one of the additional images captured during the transition. For instance, the processor 202 can sequentially receive the additional images captured during the transition, and attempt to decode the machine-readable indicia in each of the additional images. The processor 202 may cause the driver circuitry 212 to halt the transition from the first opacity level to the second opacity level immediately after successfully decoding the machine-readable indicia in one of the additional images captured during the transition.

Once the transition of the electrochromic component 210 is complete, the processor 202 can decode the machine-readable indicia using an image captured. For instance, once the electrochromic component 210 transitions from the opaque state to the transparent state (or a translucent state therebetween), the processor 202 can use an image captured by the image sensor 204 in the transparent state (or any translucent or diffusive state therebetween) to decode the machine-readable indicia.

Referring now to FIG. 7, a flowchart illustrating another illustrative method 700 of scanning or imaging machine-readable indicia by dynamically controlling illumination is shown. The method 700 can be viewed as a more detailed implementation of the method 600 of FIG. 6. The method 700 can include the light source 208 emitting light 218 to illuminate the surface 214 including the machine-readable indicia (STEP 702), and the image sensor 204 capturing a first image of the machine-readable indicia 216 (or of the surface 214 including the machine-readable indicia 216) while the electrochromic component 210 is at a first opacity level or state (STEP 702). These steps are similar to steps 602 and 604 of FIG. 6. The first opacity level or state can be the opaque state, the transparent state, or a state therebetween.

The method 700 can include the processor 202 determining whether an image parameter (or image quality parameter) of the first image satisfies a predefined condition (DECISION BLOCK 706). As described above with regard to FIG. 6, the processor 202 can receive the first image from the image sensor 204, and determine one or more image parameters of the first image. The one or more image parameters can include any combination of the image parameters described above in relation with to FIG. 6. The processor 202 can calculate and determine whether the one or more image parameters satisfy one or more predefined conditions. For instance, the processor can calculate and determine whether an image parameter is indicative of absence/existence of bright or white spots (caused by light reflected from the surface 214) in the first image. The processor 202 can calculate and determine whether an image parameter is indicative of the bright or white spots partially or fully obscuring the machine-readable indicia in the first image. The processor 202 can calculate and determine whether an image parameter is indicative of low contrast and/or low/high brightness level of the first image. The processor 202 can determine whether an image parameter is indicative of successful decoding of the machine-readable indicia 216 in the first image.

The method 700 can further include the processor 202 initiating or triggering a transition of the electrochromic component 210 to a second opacity level or state (STEP 708), and the image sensor 204 capturing one or more second images of the surface 214 including the machine-readable indicia 216 (STEP 710), responsive to determining at decision block 706 that the image parameter does not satisfy the predefined condition. For instance, upon determining that the one or more image parameters are indicative of "bad" image quality and/or unsuccessful decoding of the machine-readable indicia 216 in the first image, the processor 202 can instruct the driver circuitry 212 to cause the electrochromic component 210 to transition to the second opacity level or state. If the first opacity level or state is equal to the opaque state, the second opacity level or state may be equal to the transparent state and vice versa. The image sensor 204 can capture one or more second images of the surface 214 during and/or after the transition of the electrochromic component 210 from the first opacity level or state to the second opacity level or state. As described above in relation with FIG. 6, the image sensor 204 can capture second images while the electrochromic component 210 is transitioning from the first opacity level or state to the second opacity level or state.

The method 700 can further include the processor 202 decoding the machine-readable indicia based on the captured first image or one of the captured second images (STEP 712). At decision block 706, if the image parameter is indicative of "good" image quality (e.g., no bright or white regions, adequate contrast and/or adequate brightness), the processor can decode the machine-readable indicia 216 in the first image. However, if the image parameter is indicative of "bad" image quality (e.g., not satisfying the predefined condition), the processor 202 can attempt to decode each of the second images captured during and/or after the transition to the second opacity state until the machine-readable indicia 216 is successfully decoded. As described above in relation with FIG. 6, the processor 202 may instruct the driver circuitry 212 to halt the transition if the processor 202 is successful in decoding any of the images captured during the transition. In some implementations, the processor 202 may decode machine-readable indicia 216 in the second image captured after the transition is complete.

The subject matter described in this specification (e.g., methods 600 and 700 and/or steps thereof) can be implemented as one or more computer programs, e.g., one or more modules of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). Accordingly, the computer storage medium is both tangible and non-transitory.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD disks. The processor and the memory can be supplemented by, or incorporated in, special purpose logic circuitry.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products embodied on tangible media.

References to "or" may be construed as inclusive so that any terms described using "or" may indicate any of a single, more than one, and all of the described terms.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The claims should not be read as limited to the described order or elements unless stated to that effect. It should be understood that various changes in form and detail may be made without departing from the spirit and scope of the appended claims. All implementations that come within the spirit and scope of the following claims and equivalents thereto are claimed.

What is claimed:

1. A reading device, comprising:
an image sensor configured to capture images;
an illumination system configured to illuminate a surface of an object, the illumination system including:
a light source configured to generate light to illuminate the surface when capturing images of the surface;
an electrochromic component arranged in front of the light source such that light generated by the light source passes through the electrochromic component; and
driver circuitry configured to control translucency of the electrochromic component; and
a processor in electrical communication with the image sensor and the driver circuitry, the processor configured to:
analyze a captured image to determine whether an image quality parameter of the image of the surface of the object captured by the image sensor satisfies a predefined condition;
cause, based on determining that the image quality parameter of the image of the surface of the object does not satisfy the predefined condition, the driver circuitry to adjust an electric signal being applied to the electrochromic component to alter a translucency level of the electrochromic component by transitioning from a first translucency level to a second translucency level, otherwise, maintain the electric signal being applied to the electrochromic component;
cause the image sensor to capture one or more second images of the surface of the object while the electrochromic component is transitioning from the first translucency level to the second translucency level, wherein a duration of the transition of the electrochromic component is longer than a duration of a time period for the image sensor to capture a single image; and
attempt to decode a machine-readable indicia based on each second image of the surface captured during the transition of the electrochromic component from the first translucency level to the second translucency level.

2. The reading device of claim 1, wherein the electrochromic component includes an electrochromic film or an electrochromic glass.

3. The reading device of claim 1, wherein the electric signal is a voltage being applied to the electrochromic component and the processor is further configured to cause the driver circuitry to decrease or switch OFF the voltage being applied to the electrochromic component in response to determining that the image of the machine-readable indicia is indicative of one or more pixel regions of the image sensor being saturated.

4. The reading device of claim 1, wherein the processor is further configured to cause the driver circuitry to adjust the electric signal applied to the electrochromic component in response to determining that the machine-readable indicia is not decodable from the image of the surface of the object captured by the image sensor.

5. The reading device of claim 1, wherein the processor is further configured to cause the driver circuitry to halt the transition from the first translucency level to the second translucency level in response to decoding the machine-readable indicia captured in a second image of the surface captured while the electrochromic component is transitioning from the first translucency level to the second translucency level.

6. The reading device of claim 1, wherein the processor is further configured to:

cause the image sensor to capture one or more second images of the surface of the object after the electrochromic component has completed transitioning from the first translucency level to the second translucency level; and decode the machine-readable indicia using a second image captured after completion of the electrochromic component transitioning from the first translucency level to the second translucency level.

7. The reading device of claim 1, wherein the predefined condition includes a brightness level determined from the captured image being above a brightness threshold level.

8. The reading device of claim 1, wherein the predefined condition includes a contrast level determined from the captured image being above a contrast threshold level.

9. The reading device of claim 1, wherein the predefined condition includes a number of bright spots determined from the captured image being above a number of bright spots threshold level.

10. The reading device of claim 1, wherein the predefined condition includes at least one bright spot obscuring at least part of the machine-readable indicia.

11. A method comprising:

emitting, by a reading device, a light to illuminate a surface of an object;

capturing, by the reading device, an image of the surface of the object;

analyzing the captured image and determining, by the reading device, whether an image quality parameter of the captured image of the surface captured by the image sensor satisfies a predefined condition;

adjusting, by the reading device, based on a determination that the image quality parameter of the image of the surface does not satisfy the predefined condition, an electric signal being applied to the electrochromic component to cause a translucency level of the electrochromic component to be altered by transitioning from a first translucency level to a second translucency level, otherwise, not adjusting the electric signal being applied to the electrochromic component;

capturing one or more second images of the surface while the electrochromic component is transitioning from the first translucency level to the second translucency level, wherein a duration of the transition of the electrochromic component is longer than a duration of a time period for the image sensor to capture a single image; and attempting to decode a machine-readable indicia based on each second image.

12. The method of claim 11, wherein the electrochromic component includes an electrochromic film or an electrochromic glass.

13. The method of claim 11, wherein determining whether the image quality parameter of the image of the surface satisfies the predefined condition includes:

determining whether the image includes one or more regions indicative that corresponding one or more pixel regions of the image sensor are saturated; or determining whether a machine-readable indicia depicted on the surface is decodable based on the image of the surface of the object captured by the image sensor.

14. The method of claim 13, wherein adjusting an electric signal includes adjusting a voltage being applied to the electrochromic component, and further comprising decreasing or switching OFF the voltage being applied to the electrochromic component in response to determining that the image of the surface is indicative of one or more pixel regions of the image sensor being saturated.

15. The method of claim 13, comprising adjusting the electric signal applied to the electrochromic component in response to determining that the machine-readable indicia is not decodable from the image of the surface captured by the image sensor.

16. The method of claim 11, further comprising halting the transition from the first translucency level to the second translucency level in response to decoding the machine-readable indicia based on one of the second images of the surface captured while the electrochromic component is transitioning from the first translucency level to the second translucency level.

17. The method of claim 16, further comprising decoding the machine-readable indicia using one of the second images captured after transitioning from the first translucency level to the second translucency level.

18. The method of claim 11, wherein the predefined condition includes at least one of a brightness level determined from the captured image being above a brightness threshold level, a contrast level determined from the captured image being above a contrast threshold level, and/or a number of bright spots determined from the captured image being above a number of bright spots threshold level.

* * * * *